No. 783,850. PATENTED FEB. 28, 1905.
G. L. ZUCKER.
APPARATUS FOR TREATING BUFFING TOOLS.
APPLICATION FILED MAR. 30, 1904.
2 SHEETS—SHEET 1.
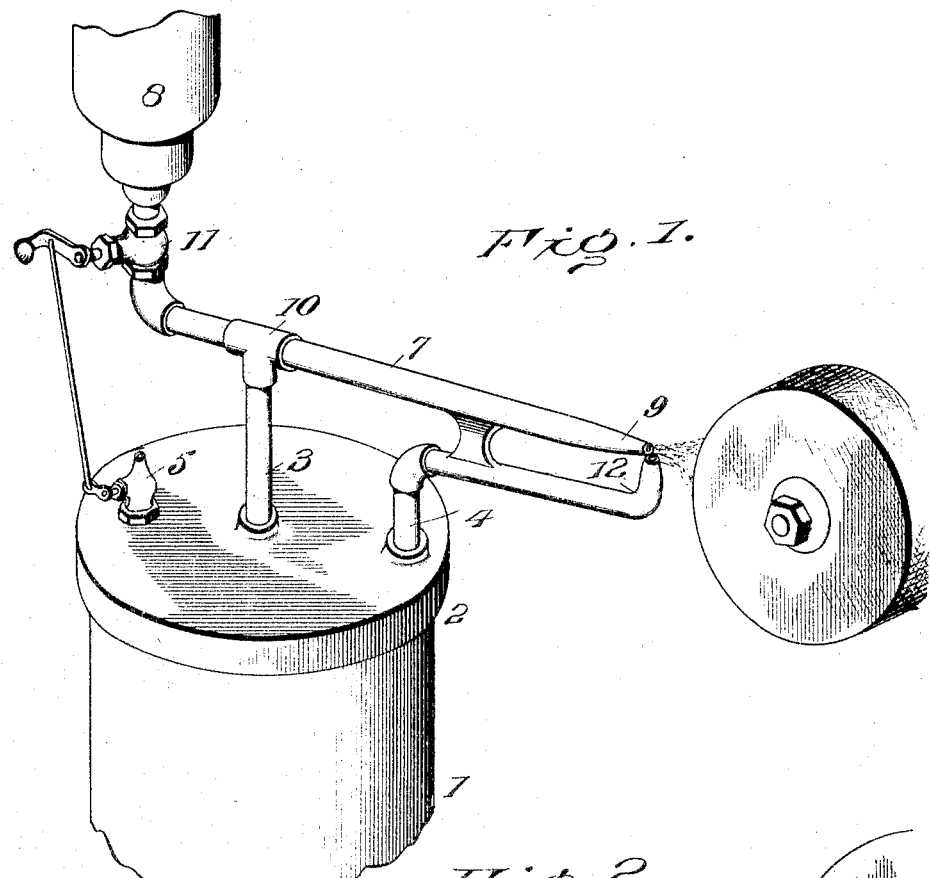
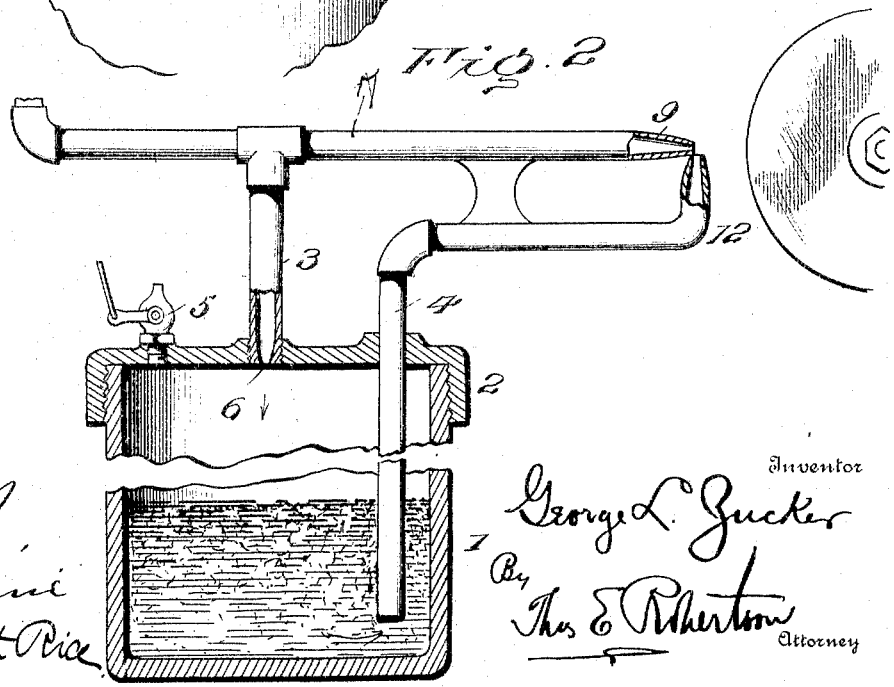

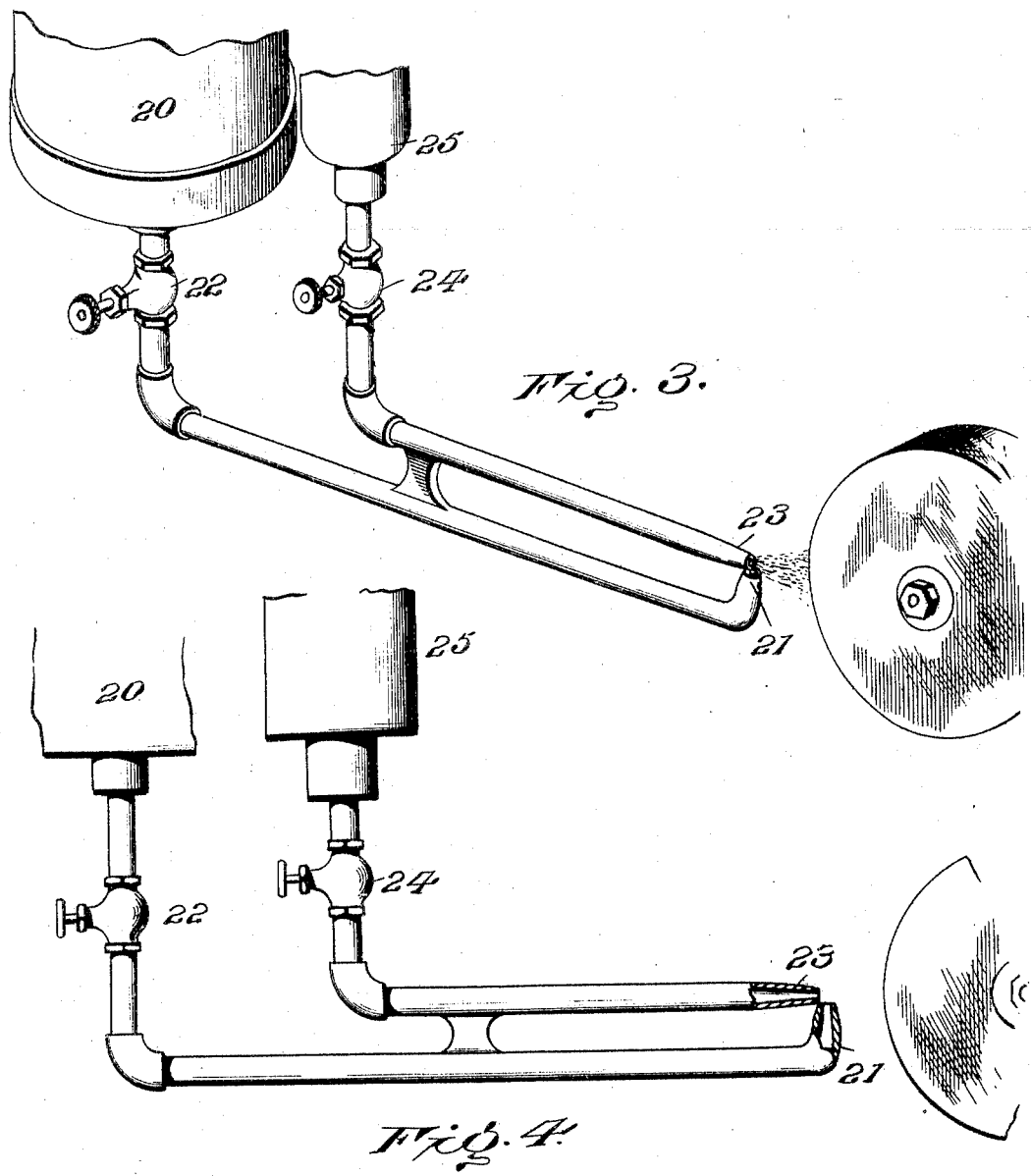

No. 783,850.

Patented February 28, 1905.

UNITED STATES PATENT OFFICE.

GEORGE L. ZUCKER, OF EAST ORANGE, NEW JERSEY, ASSIGNOR TO THE GEORGE ZUCKER COMPANY, OF NEWARK, NEW JERSEY, A CORPORATION OF NEW JERSEY.

APPARATUS FOR TREATING BUFFING-TOOLS.

SPECIFICATION forming part of Letters Patent No. 783,850, dated February 28, 1905.

Application filed March 30, 1904. Serial No. 200,829.

*To all whom it may concern:*

Be it known that I, GEORGE L. ZUCKER, a citizen of the United States of America, and a resident of East Orange, in the county of Essex, in the State of New Jersey, have invented certain new and useful Improvements in Apparatus for Treating Buffing-Tools, of which the following is a specification.

This invention relates to an improvement in an apparatus for spraying or treating the surface of buffing-wheels, which consists in the use of a receptacle for containing a quantity of oil, grease, or suitable polishing or abrasive materials in solution, which receptacle is suitably supported and has an outlet or nozzle in proximity to a buffing-wheel and has coöperating with it means for supplying air under pressure, so that the material within the receptacle may be sprayed onto the buffing-wheel as desired.

As buffing materials are now applied they become caked, hardened, or polished on the buffing-wheel, and thus greatly lose their efficiency. It is therefore necessary in actual practice to keep the surface of the buffing-wheel in a soft and fluffy condition by the use of a suitable tool; but in doing this the greater part of the wheel is from time to time worn away. It is therefore recognized that the working life of the buffing-wheel is very limited; but by spraying it with a suitable liquid I am enabled to retain the buffing-surface in a soft and fluffy condition. This reduces the necessity of dressing this surface of the buffing-wheel to a minimum.

My invention is not, however, limited to spraying oil or grease onto a buffing-wheel to soften the buffing compound previously applied; but the receptacle may contain the buffing compound in solution, so that it may itself be sprayed on the tool in sufficiently liquid state to produce the desired effect.

My invention therefore consists in the apparatus for treating buffing-wheels, as will be hereinafter described, and then definitely set forth by the claims thereof.

In the drawings accompanying and forming part hereof, and which show my invention in the embodiment I now prefer, Figure 1 is a perspective view of one form of my invention. Fig. 2 is a sectional view of the same. Fig. 3 is a perspective view of a slightly-modified way of feeding the material; and Fig. 4 is a side view, partly in section.

Referring now to the details of the drawings by numerals, and particularly to Figs. 1 and 2, 1 indicates a suitable receptacle which may be of any desired construction, but is illustrated as comprising a receptacle proper, 1, and a screw-threaded cap 2, the latter being provided with two pipes or tubes 3 and 4 and a valve or cock 5. The pipe or tube 3 is merely screwed to the cap or cover 2 and has an opening 6 of very restricted size leading into the receptacle for a purpose to be hereinafter described. The upper end of the tube or pipe 3 communicates with a horizontal pipe 7, one end of which leads to a compressed-air tank 8, and the other end is formed into a nozzle 9, as clearly shown. Between the tank and the T 10, leading to the tube or pipe 3, is a valve or cock 11, which controls the supply of compressed air, and the arrangement of the parts so far described is such that when the valve 11 is opened the air passes both to the horizontal pipe 7 of the nozzle 9 and also through the vertical tube or pipe 3 into the receptacle 1 and creates sufficient pressure in said receptacle to force any material contained therein out of the tube or pipe 4. This pipe 4 also leads to a point in proximity to the buffing-wheel and terminates in a nozzle 12, adjacent to and coacting with the compressed-air nozzle 9. It follows from the construction so far described that if an oil or grease or a buffing compound in solution is contained within the receptacle and the valve 11 is opened the compressed air passes down into the receptacle and creates such pressure therein as to cause the material within said receptacle to pass out of the pipe or tube 4 to the nozzle 12. Simultaneously the air also passes through the pipe 7 to the nozzle 9, and this nozzle is so formed and directed as to force with great pressure any material passing out of the nozzle 12, with the result that the material forced to the nozzle 12 is sprayed onto the buffing-tool. If the material contained within the receptacle is merely grease or an oil for the purpose of softening the buffing-tool, the quantity supplied to the tool may be easily controlled by the operator, whose hand may be kept on the valve 11. Likewise, if the receptacle contains buffing material the amount of this material supplied to the buffing-tool may be controlled in the same way. I have shown a valve or petcock 5, which is for the purpose of enabling the operator to relieve the pressure of air in the receptacle when it is desired that no material be fed to the nozzle 12. This will be found useful, as otherwise even after the operator shuts off the supply of compressed air the air-pressure in the receptacle might be sufficient to feed considerable material to the nozzle, which owing to the fact that no air-pressure is supplied to the nozzle 9, would simply trickle off of the nozzle 12 and go to waste. In its preferred form the handle of this valve or cock 5 is connected to the valve 11, so that as the valve 11 is opened the valve 5 is closed, and vice versa. This absolutely prevents any waste of material.

In the construction shown in Figs. 3 and 4 instead of having the material fed by air-pressure it is fed by gravity, and in this form the material is contained within a receptacle 20, which is sufficiently raised above its nozzle 21 to feed the material thereto by gravity when the valve 22 is opened. The compressed air is fed in substantially the same manner as in the other form, except in this case all the air is fed to the nozzle 23 and is controlled by a valve 24. From the description of the operation of Figs. 1 and 2 it will be understood that in the form shown in Figs. 3 and 4 the material, whether oil or grease or buffing material contained in solution, is fed by gravity from the receptacle 20, controlled by the valve 22, and as it passes out of the nozzle 21 the compressed air from the tank 25, controlled by the valve 24, forces the material onto the buffing-tool in the same manner as in the first form.

From the above it will be seen that I have invented an apparatus for spraying or forcing liquid onto a buffing-tool, the material being forced or ejected from the receptacle containing the same under pressure controlled by the operator, so that the flow may be easily and instantly kept within the requirements of the work being done.

As I have hereinbefore stated, the old method of using buffing-wheels necessarily limited the life of the wheels, for the reason that in actual practice it is found necessary to keep the surface of the wheel in a soft and fluffy condition by the use of a suitable tool, and this of course causes wear and tear on the wheel, and it is soon worn away. My method of spraying, however, keeps the surface of the wheel in a soft and fluffy condition and limits the necessity of dressing the wheel to a minimum. Moreover, when the operator dresses his wheel under the old method quantities of dust and lint from the wheel are thrown off, which the operator cannot avoid inhaling to the sacrifice of his health. Another advantage of my apparatus is that it prevents the danger of overheating the surface of the buffing-wheel and removes the danger of burning the work that is being polished, which might otherwise destroy the surface of the article and in extreme cases cause the buffing-wheel to ignite. All of these objections are overcome by the use of my apparatus.

What I claim as new is—

1. In apparatus of the character described, a nozzle for feeding material, means for delivering the material to said nozzle under pressure, and a source of compressed air acting on the material at the nozzle for forcing the material from said nozzle onto a buffing-tool, substantially as described.

2. In apparatus of the character described, a receptacle for containing the material to be applied to the buffing-tool, a nozzle connected therewith for feeding the material, a source of compressed air, means for feeding said air into the receptacle to feed the material and means for directing the air to force the material flowing from the nozzle onto the buffing-tool, substantially as described.

3. In apparatus of the character described, a nozzle for feeding material, means for delivering the material to said nozzle under pressure, a source of compressed air, a pipe leading from said source to said nozzle and thereby forcing the material from said nozzle onto a buffing-tool, and means for controlling the supply of compressed air, substantially as described.

4. In apparatus of the character described, a receptacle for containing the material to be applied to the buffing-tool, a nozzle connected therewith for feeding the material, a source of compressed air, means for feeding said air into the receptacle to force the material to said nozzle, and a pipe conducting the air to the nozzle to force the material flowing therefrom onto the buffing-tool, and means for controlling said compressed air, substantially as described.

5. In apparatus of the character described, a receptacle for controlling the material to be applied to the buffing-tool, a nozzle connected therewith for feeding the material, a source of compressed air, means for feeding said air into the receptacle to force the material from the nozzle, means for directing the air to force the material from the nozzle onto the buffing-tool, and a valve for relieving the pressure from the receptacle, substantially as described.

6. In apparatus of the character described, a receptacle for containing the material to be applied to the buffing-tool, a nozzle connected therewith for feeding the material, a source of compressed air, means for feeding the said air into the receptacle to force the material to said nozzle, a valve for controlling the air-pressure, a valve for relieving the pressure in the cylinder, said valves operating together, substantially as described.

Signed by me at Newark, New Jersey, this 28th day of March, 1904.

GEORGE L. ZUCKER.

Witnesses:
  HENRY L. ZUCKER,
  HENRY RINGHOF.